(12) United States Patent
 Chang et al.

(10) Patent No.: US 11,460,893 B2
(45) Date of Patent: Oct. 4, 2022

(54) ELECTRONIC DEVICE INCLUDING NONMETALLIC LIGHT GUIDE STRUCTURE

(71) Applicant: Samsung Electronics Co., Ltd., Gyeonggi-do (KR)

(72) Inventors: Joonwon Chang, Gyeonggi-do (KR); Jaehong Park, Gyeonggi-do (KR); Seunghoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/276,534

(22) PCT Filed: Sep. 17, 2019

(86) PCT No.: PCT/KR2019/011967
 § 371 (c)(1),
 (2) Date: Mar. 16, 2021

(87) PCT Pub. No.: WO2020/060137
 PCT Pub. Date: Mar. 26, 2020

(65) Prior Publication Data
 US 2022/0035423 A1 Feb. 3, 2022

(30) Foreign Application Priority Data

Sep. 18, 2018 (KR) .................. 10-2018-0111513

(51) Int. Cl.
 *G06F 1/16* (2006.01)
 *F21V 8/00* (2006.01)
(52) U.S. Cl.
 CPC ......... *G06F 1/1684* (2013.01); *G02B 6/0013* (2013.01); *G02B 6/0065* (2013.01)
(58) Field of Classification Search
 CPC .... G06F 1/1684; G02B 6/0013; G02B 6/0065
 See application file for complete search history.

(56) References Cited

U.S. PATENT DOCUMENTS 9,594,208 B2   3/2017   Zhou
9,830,761 B2   11/2017  Kaiser et al.
 (Continued)

FOREIGN PATENT DOCUMENTS

KR  10-1107014 B1   1/2012
KR  10-1497278 B1   2/2015
 (Continued)

*Primary Examiner* — Mary Ellen Bowman
(74) *Attorney, Agent, or Firm* — Cha & Reiter, LLC

(57) ABSTRACT

Disclosed in various embodiments of the present document are: a structure including a nonmetallic material and guiding, in one direction, light incident on one side; and an electronic device including the structure in an inner space thereof. According to the various embodiments, provided is an electronic device comprising: a housing having an inner space, and including an outer surface facing a first direction, an inner space facing the direction opposite to the first direction, and a display unit which is formed between the outer surface and the inner space and which has a thickness through which light passes through; a printed circuit board arranged in the inner space; at least one light-emitting element arranged in the inner space; and a nonmetallic structure arranged in the inner space, wherein the nonmetallic structure includes: a first part having a light guide between the light-emitting element and the display unit and including a transparent or translucent first material; a second part which is integrally formed with the first part, includes the first material, and is directly or indirectly fixed to the printed circuit board or the housing; and a third part encompassing at least a portion of the light guide and including a translucent second material. The nonmetallic light guide structure and the electronic device including same can be varied according to embodiments.

14 Claims, 6 Drawing Sheets

(56) References Cited

U.S. PATENT DOCUMENTS

2014/0153185 A1 6/2014 Lee et al.
2020/0046235 A1 2/2020 Jung et al.

FOREIGN PATENT DOCUMENTS

| KR | 10-2015-0127884 A | 11/2015 |
| KR | 10-2016-0071277 A | 6/2016 |
| KR | 10-2016-0080082 A | 7/2016 |
| KR | 10-2018-0093628 A | 8/2018 |
| KR | 10-2018-0099154 A | 9/2018 |

ELECTRONIC DEVICE INCLUDING NONMETALLIC LIGHT GUIDE STRUCTURE

CROSS-REFERENCE TO RELATED APPLICATION(S)

This application is a National Phase Entry of PCT International Application No. PCT/KR2019/011967, which was filed on Sep. 17, 2019 and claims priority to Korean Patent Application No. 10-2018-0111513, which was filed on Sep. 18, 2018 in the Korean Intellectual Property Office, the contents of which are incorporated herein by reference.

BACKGROUND

1. Field

Various embodiments disclosed in this document relate to a nonmetallic light guide structure and an electronic device including the same.

2. Description of the Related Art

An electronic device may refer to a device configured to perform a specific function according to an installed program, such as a home appliance, an electronic wallet, a portable multimedia player, a mobile communication terminal, a tablet PC, an image/sound device, a desktop/laptop computer, and a vehicle navigation system.

An electronic device may have a means for emitting various kinds of visible light (for example, red/green/blue) disposed in the inner space of the electronic device (hereinafter, referred to as a "light-emitting module") as a means for informing the user that a specific function is normally operating, or that a specific function is not currently executed normally due to an internal/external factor of the electronic device. The electronic device may be equipped with a processor, a memory, and/or an interface in order to implement a specific function. The processor may receive information from an external electronic device or may determine, based on an independent diagnosis algorithm, whether or not the electronic device is operating normally, thereby controlling the light-emitting module.

SUMMARY

A conventional light-emitting module may be configured, for example, by positioning a light-emitting element (for example, an LED) adjacent to a side surface of a housing, exposing the same, and electrically connecting the light-emitting element to a controller (for example, a processor) provided inside the electronic device. The electric connection between the light-emitting element and the controller that controls the light-emitting element may be made by extending a printed circuit board to a position close to a side surface of the housing, or by using a wiring method wherein a wire is elongated from the controller to the light-emitting element. However, such a method may pose a problem in that the printed circuit board needs to be physically elongated to the position in which the light-emitting element is installed, thereby placing many restrictions on the electronic device design, or the elongated wire may cause inflow of noise into electric signals or may delay signals due to interference or the like.

According to another embodiment, a light-emitting module provided for an electronic device may include, for example, a printed circuit board, a controller, and at least one light-emitting element mounted on the printed circuit board. It may be assumed in this case that the light-emitting element is positioned in a space inside the electronic device. The light-emitting element and the controller may accordingly be positioned relatively close to each other, thereby substantially reducing restrictions on design compared with the above-mentioned embodiment. However, a larger amount of light energy needs to be emitted by consuming a larger amount of power in order to guarantee that light emitted from the light-emitting element in such an embodiment appears the same as in the embodiment in which the light-emitting element is positioned on a side surface of the housing of the electronic device.

In an embodiment, in an attempt to reduce power consumption, a structure may be additionally included to guide light emitted from the light-emitting element out of the electronic device. However, even if such a structure for guiding light is provided, a large amount of power may still be consumed unless leak of light is prevented effectively.

As such, the position in which the light-emitting element is mounted is crucial in the case of an electronic device having a light-emitting module, and if the light-emitting element is disposed in a space inside the electronic device, for example, the structure for guiding light emitted from the light-emitting element may play an important role.

According to various embodiments disclosed in this document, a light-emitting element is spaced apart from a side member of the housing of an electronic device, and is positioned in the inner space thereof. Various embodiments disclosed in this document may provide an electronic device having a light-emitting element mounted on a printed-circuit board such that the same has a relatively short wire structure.

Various embodiments disclosed in this document may provide a light guide structure configured to prevent leak of light and to stably guide light, and an electronic device including the same.

Various embodiments disclosed in this document may provide a light guide structure manufactured by a double injection-molding method, thereby providing the merits of reduced manufacturing costs and simplified manufacturing processes, and an electronic device including the same.

Various embodiments disclosed in this document may provide an electronic device including: a housing configured to form an inner space, the housing including an outer surface facing in a first direction, an inner surface facing in a direction opposite to the first direction, and a display unit formed between the outer surface and the inner surface so as to have a thickness determined such that light passes through; a printed circuit board disposed in the inner space; at least one light-emitting element disposed in the inner space; and a nonmetallic structure disposed in the inner space, the nonmetallic structure including a first portion including a transparent or semi-transparent first material, the first portion being configured to form a light guide between the light-emitting element and the display unit, a second portion including the first material, the second portion being integrally formed with the first portion and directly or indirectly fixed to the printed circuit board or the housing, and a third portion including a second material which forms an opaque portion, the third portion being configured to surround at least a part of the light guide.

Various embodiments disclosed in this document may provide a light guide structure including: a first portion including a transparent or semi-transparent material, the first portion being configured to form a light guide to guide externally incident light in one direction; a second portion including the first material, the second portion being integrally formed with the first portion and configured to form a fastening portion such that the first portion is fixed to an external structure; and a third portion including an opaque second material, the third portion being configured to surround at least a part of the light guide, wherein the third portion is double injection-molded on the first portion and the second portion.

According to various embodiments disclosed in this document, a light guide structure may be used to dispose a light-emitting element inside an electronic device, thereby minimizing restrictions on electronic device design.

According to various embodiments, the light guide structure may be made of a nonmetallic material, thereby reducing manufacturing costs and simplifying manufacturing processes.

According to various embodiments described below through the detailed description of the disclosure, a structure may be provided to seal a light guide structure on a printed circuit board and a housing, thereby effectively preventing a leak of light.

DETAILED DESCRIPTION

Hereinafter, various embodiments of the disclosure will be described with reference to the accompanying drawings.

Figure 1:
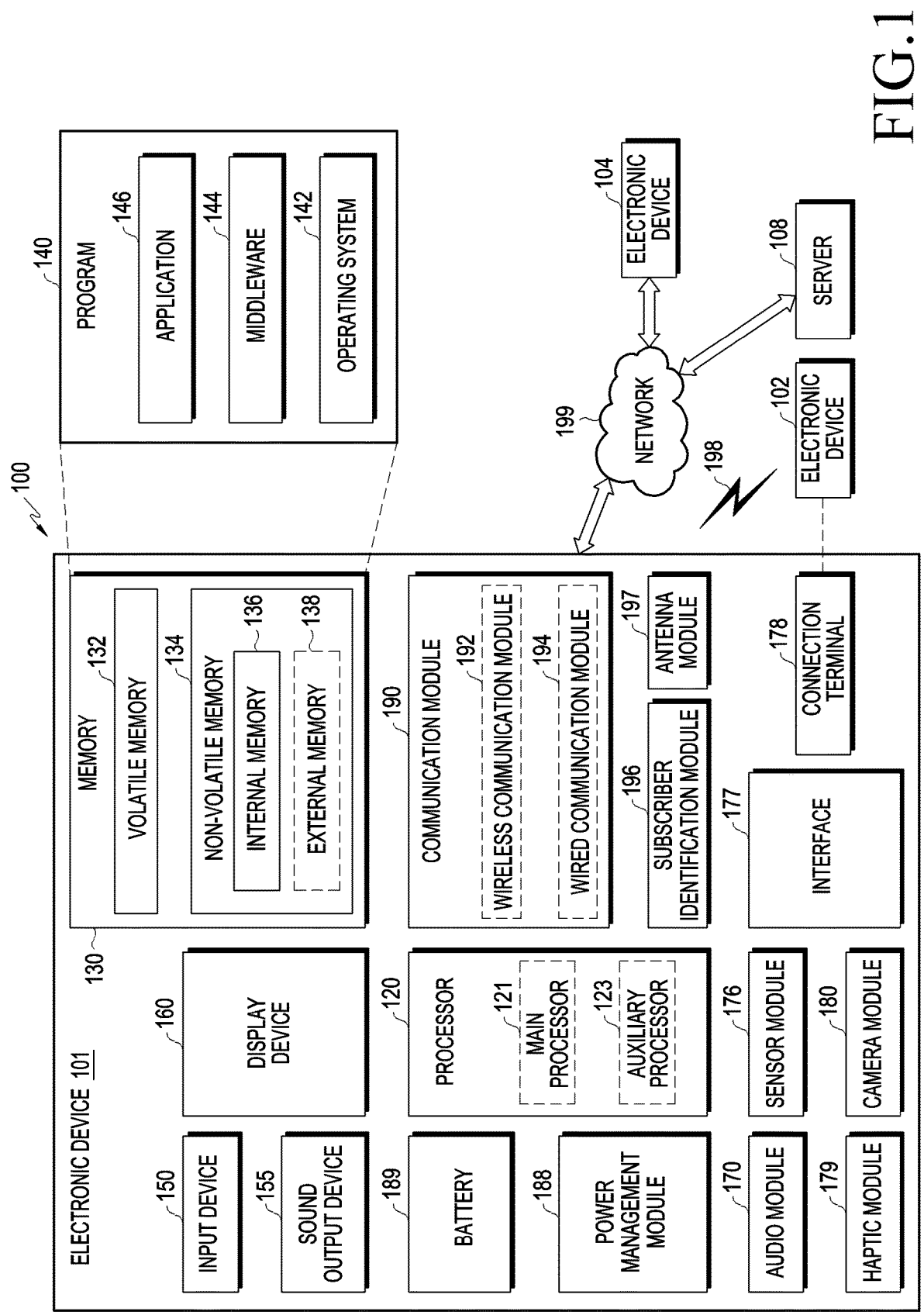
FIG. 1 is a block diagram of an electronic device inside a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
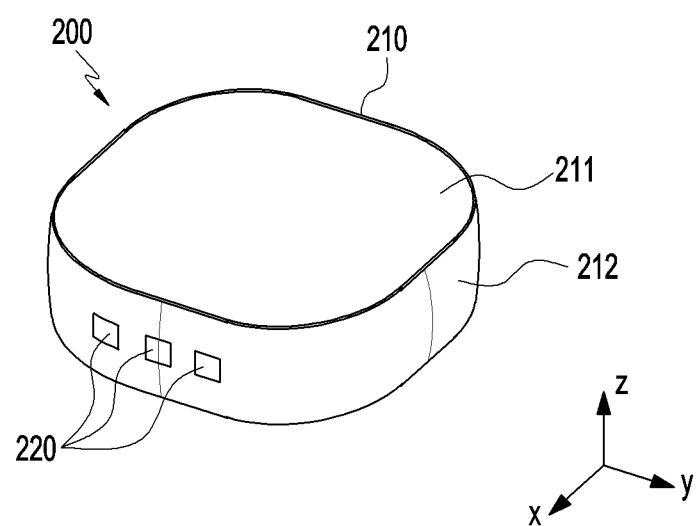
FIG. 2 is a perspective view of an electronic device according to various embodiments disclosed in this document.

FIG. 2 is a perspective view of an electronic device 200 (for example, 101 in FIG. 1) according to various embodiments disclosed in this document.

The electronic device 200 according to various embodiments disclosed in this document may be various types of devices. The electronic device 200 may include, for example, a wired/wireless router, a portable communication device (for example, a smartphone), a computer device, a multimedia device, a medical device, a camera, a wearable device, or a home appliance. The electronic device according to embodiments of this document is not limited to the above-mentioned devices.

Referring to FIG. 2, the electronic device 200 may include a housing 210 including an upper cover 211, a lower plate (not illustrated), and a side member 212. The space between the upper cover 211 and the lower cover (not illustrated) may be surrounded by the side member 212, thereby forming an inner space (for example, S2 in FIG. 9 described later).

According to various embodiments, a processor (for example, 120 in FIG. 1), a memory (for example, 130 in FIG. 1), and/or an interface (for example, 177 in FIG. 1) may be disposed in the inner space (for example, S2 in FIG. 9 described later) of the electronic device 200. The electronic device 200 may further include a printed circuit board (for example, 400 in FIG. 3) for mounting the processor, the memory, and/or the interface in the inner space.

According to various embodiments, a display unit 220 may be formed on a side surface of the housing 210 (for example, a side surface of the side member 212) so as to inform the user through the display unit 220 that a specific function of the electronic device 200 is operating normally, or that a specific function is not currently performed normally due to an internal/external factor of the electronic device 200.

Figure 3:
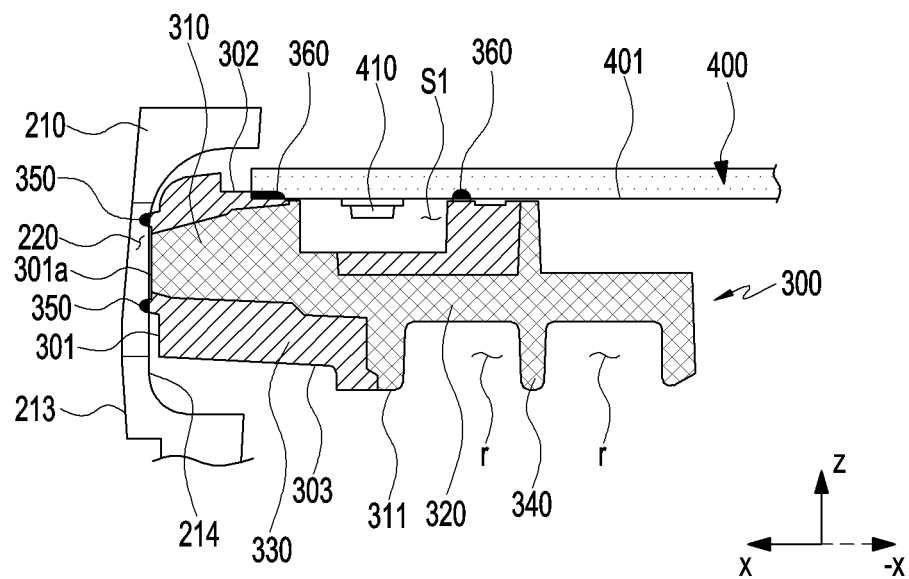
FIG. 3 is a diagram illustrating a partial section of an electronic device including a nonmetallic structure according to various embodiments disclosed in this document.

FIG. 3 is a diagram illustrating a partial section of an electronic device (for example, 200 in FIG. 2) including a nonmetallic structure 300 according to various embodiments disclosed in this document.

Referring to FIG. 3, the housing 210 may include an outer surface 213 facing in a first direction and an inner surface 214 facing in the opposite direction to the first direction, and a display unit 220 may be formed between the outer surface 213 and the inner surface 214. The display unit 220 may be formed to have various thicknesses determined such that light can pass through the same.

The electronic device (for example, 200 in FIG. 2) according to various embodiments disclosed in this document may further include a nonmetallic light guide structure 300 (hereinafter, referred to as a "nonmetallic structure") and at least one light-emitting element 410. The light-emitting element 410 may be mounted and disposed on a surface 401 of a printed circuit board 400 in the inner space??? (for example, S2 in FIG. 9 described later) of the electronic device (for example, 200 in FIG. 2).

According to an embodiment, the nonmetallic structure 300 may be disposed between the housing 210 (more specifically, the display unit 220) and the printed circuit 400 so as to play the role of guiding light emitted from the light-emitting element 410 toward the housing 210 and to play the role of firmly fixing the printed circuit board 400 to the housing 210.

Figure 4:
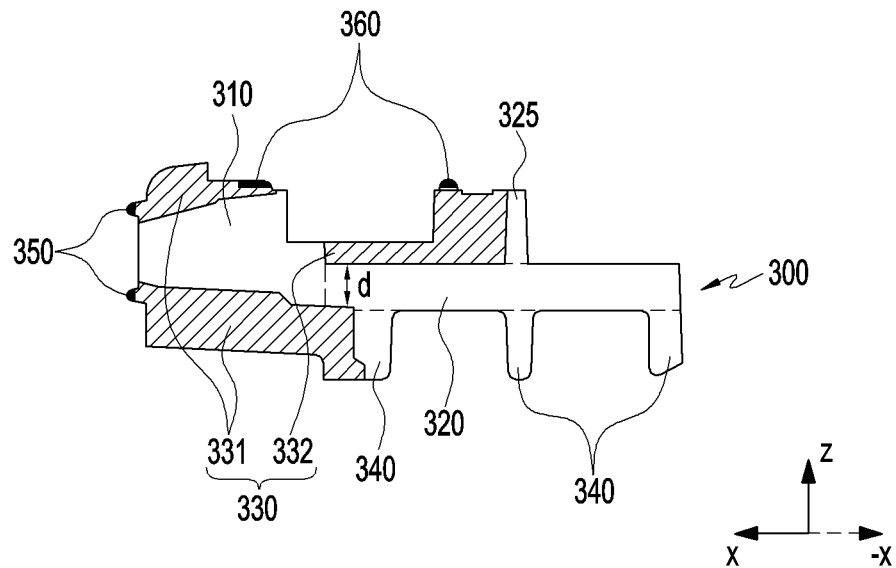
FIG. 4 is a sectional view of a nonmetallic structure according to various embodiments disclosed in this document.

FIG. 4 is a sectional view of a nonmetallic structure 300 according to various embodiments disclosed in this document.

Referring to FIG. 3 and FIG. 4 together, the nonmetallic structure 300 according to various embodiments may include a first portion 310 configured to provide a light guide between the light-emitting element 410 and the display unit 220, a second portion 320 directly or indirectly fixed to the printed circuit board 400 or the housing 210, and a third portion 330 surrounding at least a part of the light guide. The description that the first portion 310 provides a light guide may mean that a movement path is provided such that light emitted from the light-emitting element 410 is directed in a direction. In addition, the second portion 320 may have the shape of a plate or a bracket, for example, and may be directly connected to the printed circuit board 400 or the housing 210 or indirectly connected thereto by using an intermediate structure disposed between the same and the printed circuit board 400 or the housing 210. The third portion 330 may play the role of a light shielding member, for example, and may be formed to surround at least a part of the first portion 310, which is a path of movement of light.

According to various embodiments, the first portion 310 and the second portion 320 may be made of a first material. According to an embodiment, the first material may include, for example, polycarbonate as a material for constituting the exterior of the nonmetallic structure 300. According to an embodiment, the first material may be made of a transparent or semi-transparent material such that light emitted from the first light-emitting element 410 can be discharged outwards through the nonmetallic structure 300. In addition, the first portion 310 and the second portion 320 may be integrally formed through a first process (for example, a first injection-molding process).

According to various embodiments, the third portion 330 may be made of a second material which is different from the material of the first portion 310 and the second portion 320. According to an embodiment, the second material may include, for example, urethane as a material for providing elasticity. According to an embodiment, the second material may be made of a substantially opaque material so as to prevent light emitted from the light-emitting element 410 from propagating to parts other than the light guide.

According to various embodiments, the third portion 330 may be double injection-molded on the first portion 310 and the second portion 320 through a second process (for example, a second injection-molding process). According to an embodiment, the first portion 310 and the second portion 320 may be formed first, and the third portion 330 may be double injection-molded on the surface of at least a part of the first portion 310 and on the surface of at least a part of the second portion 320. However, this is not limiting in any manner. According to another embodiment, the third portion 330 may be injection-molded first, and the first portion 310 and the second portion 320 may then be double injection-molded on the surface of at least a part of the third portion 330. That is, the expression "first/second" in connection with the first and second processes is only for distinguishing between two different processes, and does not denote the order of the processes.

According to various embodiments, the first portion 310, the second portion 320, and the third portion 330 may be substantially integrally formed by using a double injection-molding process including a first process (for example, a first injection-molding process) and a second process (for example, a second injection-molding process). The double injection-molding process, if used, makes it possible to firmly fix a structure including the first portion 310 and the second portion 320 (hereinafter, referred to as a "first structure") and a structure including the third portion 330 (hereinafter, referred to as a "second structure") without using an adhesive material (for example, a tape). In addition, manufacturing costs may be reduced in connection with forming a structure for guiding light emitted from the optical element 410, and there may also be an advantageous effect in that manufacturing processes are remarkably simplified.

Referring to FIG. 3. and FIG. 4, the first portion 310 and the third portion 330 may be disposed adjacent to a side surface (for example, a side member (for example, 212 in FIG. 2)) of the housing 210. The third portion 330 may include a first surface 301 facing the inner surface 214 of the housing 210. The first portion 310 may include a light-discharge surface 301a facing a direction parallel to the direction in which the first surface 301 is oriented, and the light-discharge surface 301a may be aligned so as to face the display unit 220 when the nonmetallic structure 300 is mounted inside the housing. The third portion 330 may include a second surface 302 and a third surface 303 facing a direction different from the direction in which the first surface 301 is oriented. According to an embodiment, the second surface 302 may face a direction perpendicular to the direction in which the first surface 301 is oriented, and the third surface 302 may also face a direction perpendicular to the direction in which the first surface 301 is oriented.

According to an embodiment, the second surface 302 may face the upper cover (for example, 211 in FIG. 2) of the electronic device (for example, 200 in FIG. 2), and the third surface 303 may face the lower plate (not illustrated) of the electronic device (for example, 200 in FIG. 2). According to an embodiment, the second surface 302 of the nonmetallic structure 300 may be forced against a surface 401 of the printed circuit board 400.

According to various embodiments, the second portion 320 may extend from at least a part of the first portion 310 toward the inner surface (for example, S2 in FIG. 9 described later) of the electronic device (for example, 200 in FIG. 2). The second portion 320 makes it possible to fix the nonmetallic structure 300 to the printed circuit board 400 and/or the housing 201 without a separate fixing structure (for example, a bracket). The second portion 320 may extend away from the inner surface 214 of the housing 210 as illustrated in FIG. 3 and FIG. 4 (for example, in the direction of −x in FIG. 3), or may extend in a different direction (for example, in the horizontal direction (for example, in the direction of y in FIG. 2)).

According to various embodiments, the second portion 320 may include various fastening structures to be connected to the printed circuit board (for example, 400 in FIG. 3) and/or the housing (for example, 210 in FIG. 3). An example of various fastening structures is reference numeral 325 illustrated in FIG. 4. Although not illustrated in detail in FIG. 4, which illustrates a section of the nonmetallic structure 300, reference numeral 325 may correspond to a part having a fastening groove formed thereon so as to have a predetermined width such that a pin structure formed on the circuit board (for example, 400 in FIG. 3) or the housing (for example, 210 in FIG. 3) is inserted therein.

The nonmetallic structure 300 according to various embodiments disclosed in this document may include a fourth portion 340 which is formed integrally with the second portion 320, and which forms a heat-radiating structure including multiple recesses r. As illustrated in FIG. 4, the fourth portion 340 may be formed on a side surface of the nonmetallic structure 300, for example, on the third surface 303 facing the lower plate (not illustrated) of the housing 210. According to an embodiment, the fourth portion 340 may be lead in from the surface of the second portion 320 inwards from a side surface of the nonmetallic structure 300, or may protrude outwards from the surface of the second portion 320, thereby forming multiple recesses r on the surface of the nonmetallic structure 300. The multiple recesses r may provide level differences on the surface of the nonmetallic structure 300 such that heat generated by the light-emitting element 410 and transferred to the nonmetallic structure 300 can be released through the third surface 303 of the nonmetallic structure 300. According to another embodiment, the fourth portion 340 may be used as a fastening structure for connecting the nonmetallic structure 300 to the printed circuit board 400 and/or the housing 210.

According to various embodiments, at least a part of the first portion 310 for providing a light guide may have a shape gradually narrowed toward the display unit 220 (for example, a cone shape). Light emitted from the light-emitting element 410 may pass through the first portion 310 made of a transparent or semi-transparent material and thus may be concentrated toward the light-discharge surface 301a.

According to various embodiments disclosed in this document, the third portion 330 may further include at least one first annular protrusion 350 on the first surface 301 that faces the inner surface such that the same protrudes toward the periphery of the display unit 220. In a state in which the first surface 301 of the third portion 330 is disposed adjacent to the display unit 220, the first annular protrusion 350 may protrude toward the periphery of the display unit 220, thereby forming a sealing structure. Therefore, light concentrated toward the light-discharge surface 301a of the first portion 310 may be transmitted outwards through the housing 210 while being sealed by the first annular protrusion 350, thereby preventing leak of light. The first annular protrusion 350 may be a part integrally formed from the first surface 301 through a second process (for example, a second injection-molding process). According to an embodiment in which the third portion 330 includes an elastic material (for example, urethane), the first annular protrusion 350 also has elasticity, and this may guarantee that, when the nonmetallic structure 300 is mounted onside the electronic device (for example, 200 in FIG. 2), the first annular protrusion 350 is pressurized and thus forced toward the periphery of the second display unit 220, thereby preventing leak of light.

Referring back to FIG. 3 and FIG. 4, the light-emitting element 410 may be mounted on a surface 401 of the printed circuit board 400. The first portion 310 and the third portion 330 may provide a mounting space S1 such that the light-emitting element 410 can be mounted on a surface 401 of the printed circuit board 400. The mounting space S1 is, referring to FIG. 3 and FIG. 4, illustrated as a space surrounded by multiple surfaces (for example, it may be inferred, with reference to FIG. 3 and FIG. 5 (described later) together, that six surfaces are formed), but is not necessarily limited thereto.

According to an embodiment, by securing the mounting space S1, it becomes possible to prevent transfer of heat from the light-emitting element 410 to other electronic components inside the nonmetallic structure 300, the printed circuit board 400, and/or the electronic device 200.

Figure 5:
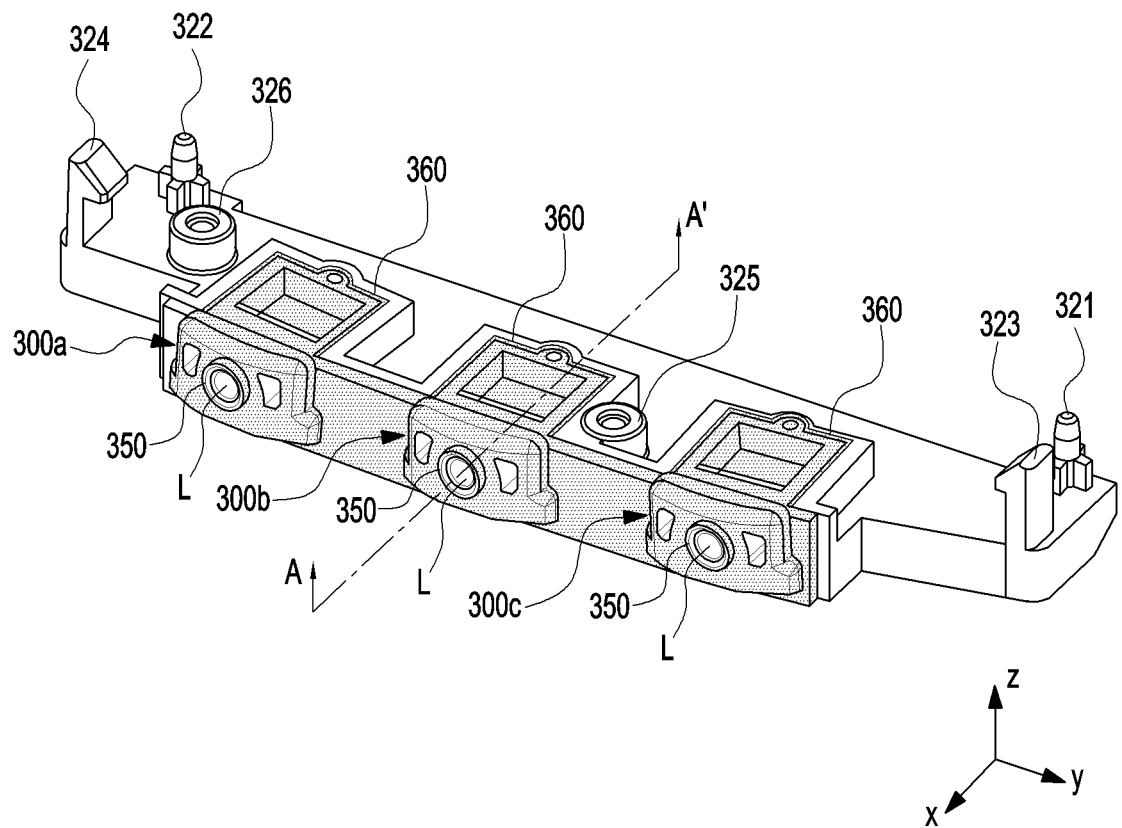
FIG. 5 is a perspective view of a nonmetallic structure according to various embodiments disclosed in this document.

According to various embodiments, the third portion 330 may surround at least a part of the mounting space S1 such that light emitted from the light-emitting element 410 can be concentrated in one direction. As used herein, one direction may refer to a direction in which the light-emitting element 410 faces the display unit 220. For example, the third portion 330 may include some of multiple surfaces forming the mounting space S1. This may prevent light emitted from the light-emitting element 410 from being directed in a direction other than toward the display unit 220 (for example, in the direction in which the second portion 320 extends). According to an embodiment, the third portion 330 may be formed perpendicular to the rear side of the light-emitting element 410 such that, as illustrated in FIG. 3, light emitted from the light-emitting element 410 is directed forwards (for example, toward the display unit 220). According to various embodiments, the third portion 330 of the nonmetallic structure 300 may be divided into a $(3-1)^{th}$ portion 331 and $(3-2)^{th}$ portion 332. The $(3-1)^{th}$ portion 331 may surround the peripheral part of the first portion 310 in order to surround the periphery of the path along which light is guided by the first portion 310. The $(3-2)^{th}$ portion 332 may be formed to surround parts other than at least one surface of the mounting space S1 such that light emitted from the light-emitting element 410 can be concentrated forwards only (for example, toward the display unit 220). According to an embodiment, the $(3-2)^{th}$ portion 332 may be formed perpendicularly to the rear side of the light-emitting element 410. Referring to FIG. 3 and FIG. 5 (described later), the $(3-2)^{th}$ portion 332 may be surrounded by the first portion 310 and the second portion 320. The $(3-2)^{th}$ portion 332 may play the role of a core material for injection-molding process of the first portion 310 and the second portion 320.

According to various embodiments, if the first portion 310 for providing a light guide is integrally formed with the second portion 320 for connecting the same with the printed circuit board 400 and/or the housing 210, a part of light passing through the first portion 310 may leak through the second portion 320. In order to prevent such a leak of light, the thickness d of the part that connects the first portion 310 and the second portion 320 may be variously designated. For example, a minimum thickness d for an injection-molding work (for example, a first injection-molding process) may be configured to prevent the leak of light.

According to various embodiments disclosed in this document, the third portion 330 may further include at least one second annular protrusion 360 protruding from the second surface 302. If the second surface 302 of the third portion 330 is disposed to face the printed circuit board 400, and if the light-emitting element 410 is disposed in the mounting space S1, the second annular protrusion 360 may form a sealing structure around the light-emitting element 410. Therefore, light emitted from the light-emitting element 410 may guide toward the first portion 310 while being sealed by the second annular protrusion 360. Leak of light may be prevented by the third portion 330 surrounding at least a part of the mounting space S1, and by the second annular protrusion 360 firmly sealing between the printed circuit board 400 and the third portion 330.

To summarize the above description, the structure that serves as a light guide may be made of a nonmetallic material, thereby reducing manufacturing costs and simplifying manufacturing processes. In addition, a structure for sealing the light guide structure to the printed circuit board and the housing may be provided, thereby effectively preventing the leak of light. In various embodiments disclosed in this document, a double light-leak prevention structure may be implemented by using the first annular protrusion 350 and the second annular protrusion 360.

Hereinafter, various embodiments of the nonmetallic structure 300 will be described with reference to FIG. 5 to FIG. 8. For reference, sectional views of FIG. 3 and FIG. 4 described above may be taken along line A-A' in FIG. 5.

Figure 6:
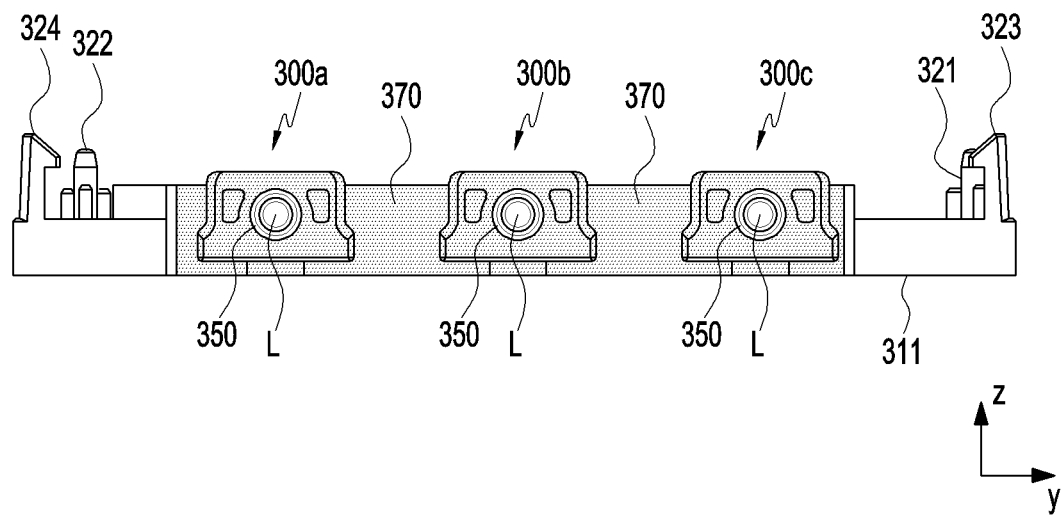
FIG. 6 is a front view of a nonmetallic structure according to various embodiments disclosed in this document.
Figure 7:
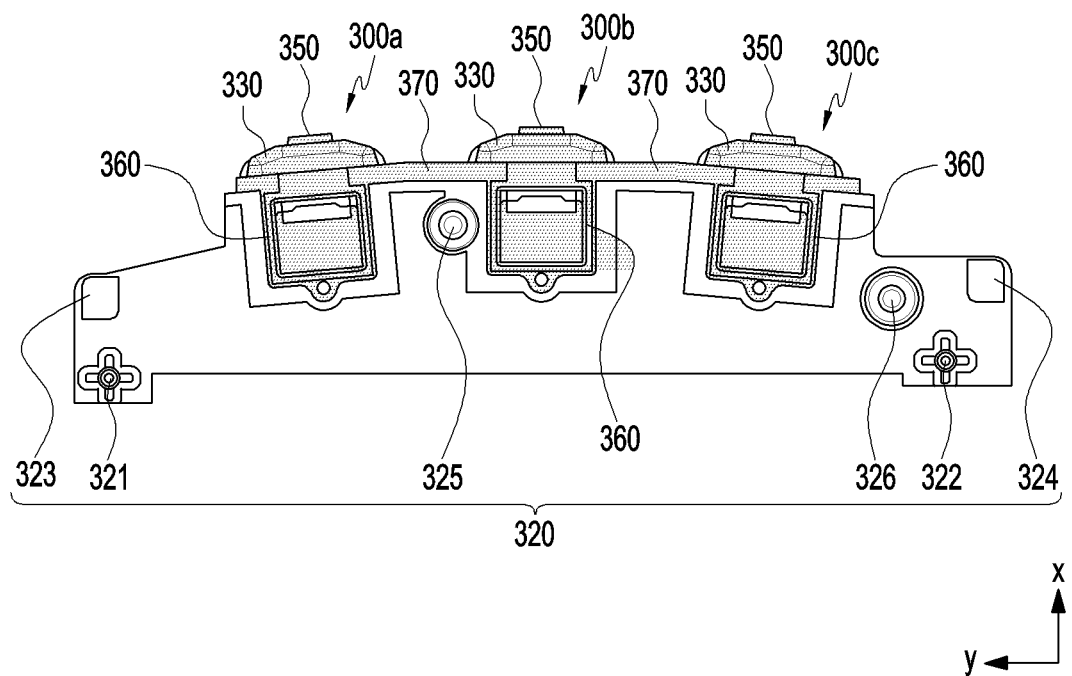
FIG. 7 is a top view of a nonmetallic structure according to various embodiments disclosed in this document.
Figure 8:
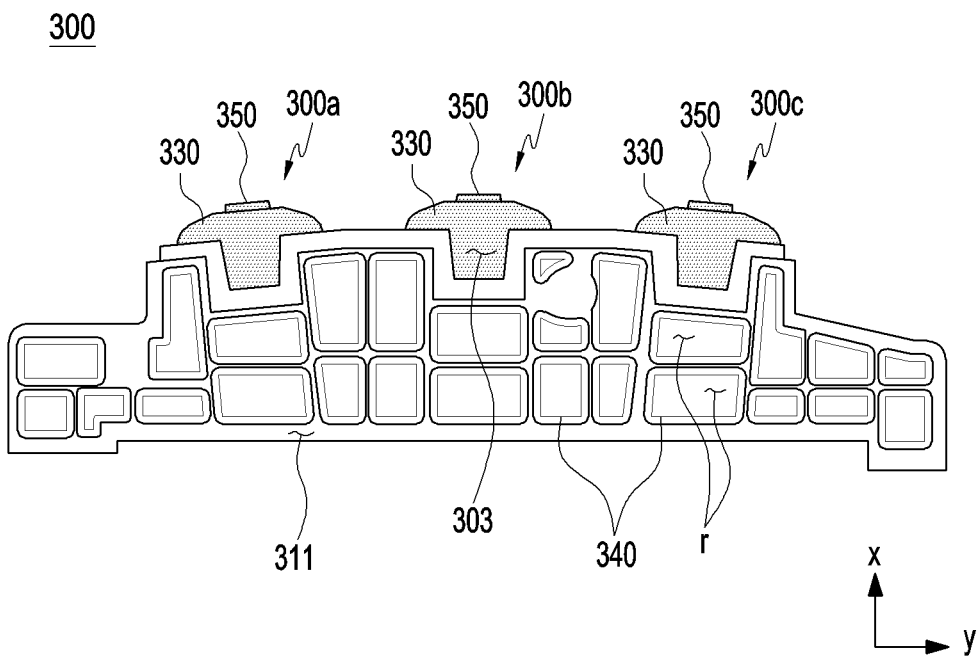
FIG. 8 is a rear view of a nonmetallic structure according to various embodiments disclosed in this document.

FIG. 5 is a perspective view of a nonmetallic structure 300 according to various embodiments disclosed in this document. FIG. 6 is a front view of a nonmetallic structure 300 according to various embodiments disclosed in this document. FIG. 7 is a top view of a nonmetallic structure 300 according to various embodiments disclosed in this document. FIG. 8 is a rear view of a nonmetallic structure 300 according to various embodiments disclosed in this document.

According to various embodiments, multiple display units (for example, 220 in FIG. 3) and multiple light-emitting elements (for example, 410 in FIG. 3) may be provided, and the first portion 310 may provide multiple light guides with regard to the multiple light-emitting elements (for example, 410 in FIG. 3), respectively. Referring to FIG. 5 to FIG. 8, the nonmetallic structure 300 may include multiple light guide structures. Although three light guide structures 300a, 300b, and 300c are illustrated in the drawings as the multiple light guide structures, but are not necessarily limited thereto, and two light guide structures or at least four light guide structures may be provided depending on the type and/or specification of the electronic device (for example, 200 in FIG. 2). One display unit (for example, 220 in FIG. 3) and one light-emitting element (for example, 410 in FIG. 3) may correspond to one of the multiple light guide structures 300a, 300b, and 300c, and each of the multiple light guide structures 300a, 300b, and 300c may individually guide and discharge light emitted from the light-emitting element (for example, 410 in FIG. 3). The lens unit L illustrated in FIG. 5 and FIG. 6 may correspond to the light-discharge surface 301a of the first portion 310 described above.

According to various embodiments, the multiple light guide structures 300a, 300b, and 300c may be disposed in parallel to each other in a direction (for example, in a direction parallel to y-direction). Among the multiple light guide structures 300a, 300b, and 300c, two adjacent light guide structures (for example, 300a and 300b or 300b and 300c) may be spaced apart by a predetermined distance.

According to various embodiments, the nonmetallic structure 300 including multiple light guide structures 300a, 300b, and 300c may also be manufactured through a double injection-molding method. For example, first portions (for example, 310 in FIG. 3) and second portions (for example, 320 in FIG. 3) of the multiple light guide structures 300a, 300b, and 300c may be formed through a first process (for example, a first injection-molding process), and third portions (for example, 330 in FIG. 3) of the multiple light guide structures 300a, 300b, and 300c may be formed through a second process (for example, a second injection-molding process). Accordingly, each of the first portions (for example, 310 in FIG. 3) and the second portions (for example, 320 in FIG. 3) of the multiple light guide structures 300a, 300b, and 300c may be formed integrally with the first portion (for example, 310 in FIG. 3) and the second portion (for example, 320 in FIG. 3) of an adjacent light guide structure. In addition, the third portions (for example, 330 in FIG. 3) of the multiple light guide structures 300a, 300b, and 300c may be formed integrally with the third portion (for example, 330 in FIG. 3) of an adjacent light guide structure.

Referring to FIG. 5 to FIG. 7, a connection part 370 is formed between adjacent third portions (for example, 330 in FIG. 3), and this may be advantageous in that the connection part 370 provides a higher level of light blocking.

According to various embodiments, if the nonmetallic structure 300 includes multiple light guide structures 300a, 300b, and 300c, the same may have multiple first annular protrusions 350, and may have multiple second annular protrusions 360 additionally or separately. According to an embodiment, each of the multiple light guide structures 300a, 300b, and 300c may have a first annular protrusion 350 and a second annular protrusion 360.

According to various embodiments, the second portion 320 may integrally extend from at least a part of the first portion (for example, 310 in FIG. 3) in a direction (for example, in the opposite direction to x in FIG. 5 and/or in the y direction in FIG. 5). According to an embodiment, the entire second portion 320 may have a bracket shape as illustrated in FIG. 5 to FIG. 8. In addition, the nonmetallic structure 300 may include a second portion 320 having a fastening structure according to various embodiments, as a means for fixing with the printed circuit board (for example, 400 in FIG. 3) and/or the housing (for example, 210 in FIG. 3).

The second portion 320 having a fastening structure according to various embodiments may be formed to have various wedge structures as indicated by reference numerals 321 and 322, various engaging ledge structures as indicated by reference numerals 323 and 324, and/or various fastening-groove structures as indicated by reference numerals 325 and 326, for example. The shape of the fastening structure of the second portion 320 is not limited to above shapes, and may be further diversified according to embodiments. The above-mentioned fastening structures 321, 322, 323, 324, 325, and 326 according to various embodiments may be simultaneously molded through a first process (for example, a first injection-molding process).

At least one of the fastening structures 321, 322, 323, 324, 325, and 326 according to various embodiments may be connected to the printed circuit (for example, 400 in FIG. 3), and at least another may be connected to the housing (for example, 210 in FIG. 3).

Referring to FIG. 8, a fourth portion 340 according to various embodiments is illustrated. The fourth portion 340 may be provided on the lower surface 311 of the second portion 320 and configured to be indented or to protrude toward the second portion 320, and may provide multiple recesses r. Accordingly, heat generated when the light-emitting element 410 emits light may be effectively discharged to the inner space (for example, S2 in FIG. 9 described later) of the electronic device. According to another embodiment, the nonmetallic structure 300 may be fixed to the printed circuit board (for example, 400 in FIG. 3) and/or the housing (for example, 210 in FIG. 3) by using the stepped structure of the fourth portion 340.

Figure 9:
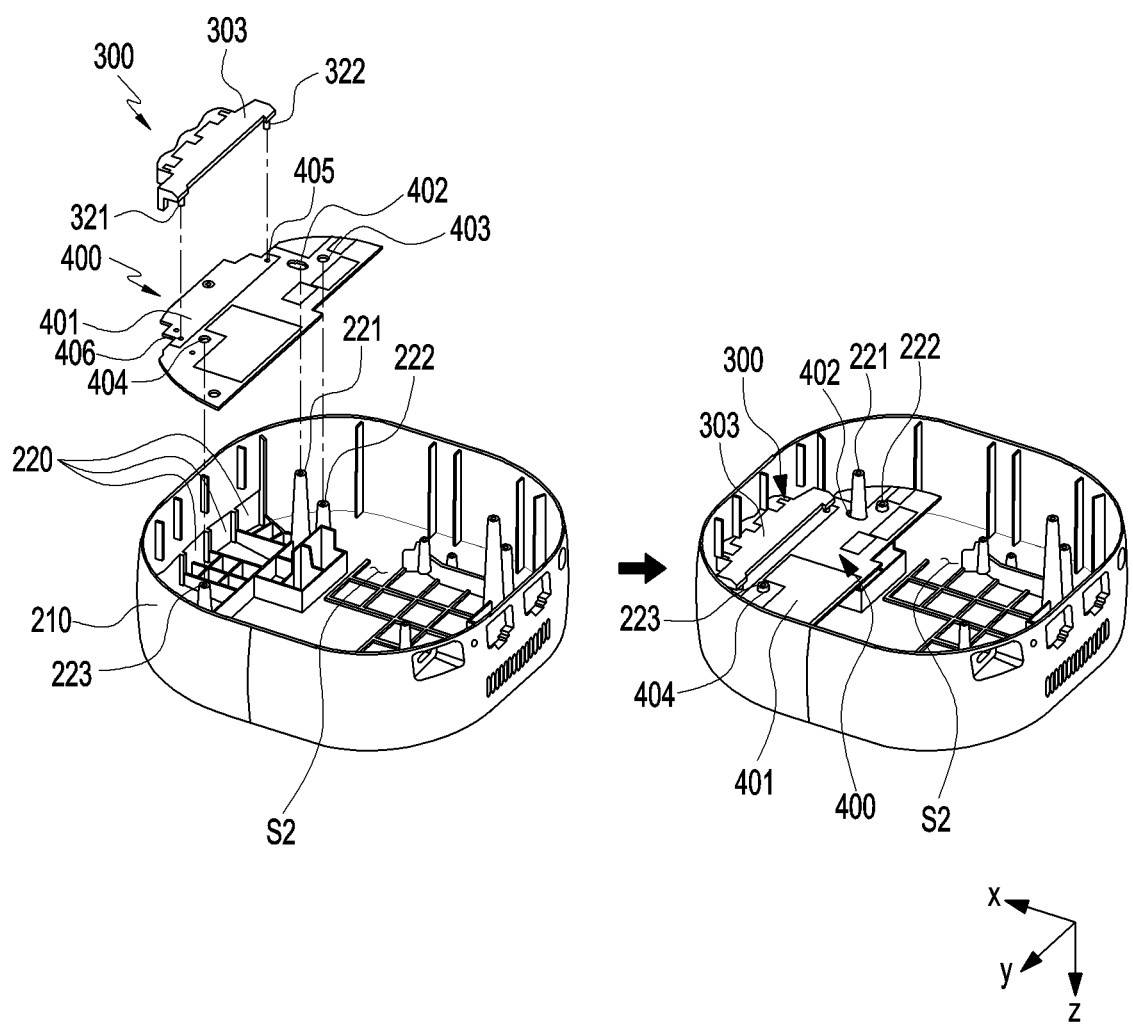
FIG. 9 is an inner perspective view of an electronic device illustrating how a nonmetallic structure and a printed circuit board are mounted.

FIG. 9 is an inner perspective view of an electronic device 200 illustrating how a nonmetallic structure 300 and a printed circuit board 400 are mounted. FIG. 9 may illustrate an embodiment in which, after the lower plate of the electronic device 200 is removed, a nonmetallic structure 300 and a printed circuit board 400 are assembled. The third surface 303 of the nonmetallic structure 300 is illustrated in FIG. 9 so as to face upwards. Referring to FIG. 9, a display unit 220 is formed on one side of the housing 210 of the electronic device 200, and multiple fixing structures are formed on the inner surface of a side member of the housing 210 and on the inner surface of an upper cover thereof.

According to various embodiments, the printed circuit board 400 and the nonmetallic structure 300 may be fastened and fixed to at least one of the multiple fixing structures formed on the inner surface of the side member of the housing 210 and on the inner surface of an upper cover thereof.

According to various embodiments, at least one of the fastening structures (for example, 321, 322, 323, 324, 325, and 326 in FIG. 5 to FIG. 7) of the second portion 320 may be coupled to at least one of the fastening structures 405 and 406 of the printed circuit board 400. In addition, at least one of other fastening structures 402, 403 and 404 of the printed circuit board 400 may be coupled to at least one of multiple fixing structures (for example, 221, 222, and 223) formed on the inner surface of the side member of the housing 210 and on the inner surface of the upper cover thereof.

Referring to FIG. 3 and FIG. 9 together, when the nonmetallic structure 300 is disposed in the inner space S2, the printed circuit board 400 may be disposed so as to cover at least a part of the upper portion of the nonmetallic structure 300. For example, in a state in which a surface (for example, 401 in FIG. 3) of the printed circuit board 400 is disposed to face the second surface (for example, 302 in FIG. 3) of the nonmetallic structure 300, the nonmetallic structure 300 and the printed circuit board 400 may be coupled and fixed to fixing structures formed on the inner surface of the side member of the housing 210 and on the inner surface of the upper cover thereof.

According to the above-described embodiments, it is possible to dispose a light-emitting element (for example, 410 in FIG. 3) inside the electronic device, thereby minimizing restrictions on the electronic device design, and light can be stably guided out of the electronic device 200 through a light guide structure.

In addition, according to an embodiment, a light-emitting element (for example, 410 in FIG. 3) is mounted on a surface 401 of the printed circuit board 400, emits light in a state in which a nonmetallic structure 300 is fastened beneath the same. FIG. 9 is a perspective view illustrating the inner structure of an electronic device 200 from below. Consequently, the light-emitting element (for example, 410 in FIG. 3) is mounted to face the lower plate (not illustrated) of the electronic device 200 during actual use of the electronic device 200, and emits light toward the lower plate (not illustrated) of the electronic device 200. Therefore, leak of light toward the upper cover of the electronic device 200 can be fundamentally prevented.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Various embodiments disclosed in this document may provide an electronic device (for example, 200 in FIG. 2) including: a housing (for example, 210 in FIG. 2) configured to form an inner space (for example, S2 in FIG. 9), the housing including an outer surface (for example, 213 in FIG. 3) facing in a first direction (for example, −x in FIG. 3), an inner surface (for example, 214 in FIG. 3) facing in a direction (for example, −x in FIG. 3) opposite to the first direction, and a display unit (for example, 220 in FIG. 3) formed between the outer surface and the inner surface so as to have a thickness determined such that light can pass through; a printed circuit board (for example, 400 in FIG. 3) disposed in the inner space???; at least one light-emitting element (for example, 410 in FIG. 3) disposed in the inner space; and a nonmetallic structure (for example, 300 in FIG. 3) disposed in the inner space, the nonmetallic structure including a first portion (for example, 310 in FIG. 3) including a transparent or semi-transparent material, the first portion being configured to form a light guide between the light-emitting element and the display unit, a second portion (for example, 320 in FIG. 3) including the first material, the second portion being integrally formed with the first portion and directly or indirectly fixed to the printed circuit board or the housing, and a third portion (for example, 330 in FIG. 3) including a second material which forms an opaque portion, the third portion being configured to surround at least a part of the light guide.

According to various embodiments, the first material may include polycarbonate.

According to various embodiments, the second material may include urethane.

According to various embodiments, the third portion may be double injection-molded on the first portion and the second portion.

According to various embodiments, the first portion, the second portion, and the third portion may all be integrally formed.

According to various embodiments, the third portion may include a first surface (for example, 301 in FIG. 3) facing the inner surface, and may further include at least one first annular protrusion (for example, 350 in FIG. 3) protruding from the first surface toward the periphery of the display unit.

According to various embodiments, a transparent or semi-transparent material may be further included inside the display unit.

According to various embodiments, the light-emitting element may be mounted on a surface of the printed circuit board.

According to various embodiments, the first portion and the third portion may provide a mounting space (for example, S1 in FIG. 3) such that the light-emitting element can be mounted on a surface of the printed circuit board.

According to various embodiments, the third portion may surround at least a part of the first portion.

According to various embodiments, the third portion may surround at least a part of the mounting space such that light emitted from the light-emitting element is directed toward the display unit.

According to various embodiments, the third portion may include a second surface (for example, 302 in FIG. 3) facing the printed circuit board, and may further include at least one second annular protrusion (for example, 360 in FIG. 3) protruding from the second surface.

According to various embodiments, the printed circuit board may be disposed to cover at least a part of the upper portion of the nonmetallic structure when the nonmetallic structure is disposed in the inner space.

According to various embodiments, the light guide may have a width decreasing toward the display unit.

According to various embodiments, a fourth portion (for example, 340 in FIG. 3) may be integrally formed with the second portion, may include the first material, and may form a heat-radiating structure including multiple recesses.

According to various embodiments, multiple display units and multiple light-emitting elements may be provided, and the first portion may provide multiple light guides with regard to the multiple light-emitting elements, respectively.

Various embodiments disclosed in this document may provide a light guide structure including: a first portion (for example, 310 in FIG. 3) including a transparent or semi-transparent material, the first portion being configured to form a light guide to guide externally incident light s in one direction; a second portion (for example, 320 in FIG. 3) including the first material, the second portion being integrally formed with the first portion and configured to form a fastening portion such that the first portion is fixed to an external structure; and a third portion (for example, 330 in FIG. 3) including a second material which forms an opaque portion, the third portion being configured to surround at least a part of the light guide, wherein the third portion is double injection-molded on the first portion and the second portion.

According to various embodiments, the first material and the second material may be made of nonmetallic materials.

According to various embodiments, the first portion and the third portion may provide a mounting space (for example, S1 in FIG. 3) such that a light-emitting element can be mounted.

According to various embodiments, the third portion may surround at least a part of the mounting space such that light emitted from the light-emitting element can be directed in one direction.

According to various embodiments, a fourth portion (for example, 340 in FIG. 3) may be integrally formed with the second portion, may include the first material, and may form a heat-radiating structure including multiple recesses.

Although specific embodiments have been described in the above detailed description of the disclosure, it will be obvious to a person skilled in the art that various modifications can be made without deviating from the scope of the disclosure.

What is claimed is:

1. A light guide structure comprising:
   a first portion comprising a transparent or semi-transparent first material, the first portion being configured to form a light guide to guide externally incident light in one direction;
   a second portion comprising the first material, the second portion being integrally formed with the first portion and configured to form a fastening portion such that the first portion is fixed to an external structure; and
   a third portion comprising a second material which forms an opaque portion, the third portion being configured to surround at least a part of the light guide,
   wherein the third portion is double injection-molded on the first portion and the second portion.

2. The light guide structure of claim 1, wherein the first material and the second material are made of nonmetallic materials.

3. The light guide structure of claim 1, wherein the first portion and the third portion provide a mounting space such that a light-emitting element can be mounted on a surface of a printed circuit board.

4. The light guide structure of claim 1, wherein the third portion surrounds at least a part of a mounting space such that light emitted from a light-emitting element is directed one direction.

5. The light guide structure of claim 1, comprising a fourth portion integrally formed with the second portion, the fourth portion comprising the first material and being configured to form a heat-radiating structure comprising multiple recesses.

6. The light guide structure of claim 1, wherein the first material comprises polycarbonate.

7. The light guide structure of claim 1, wherein the second material comprises urethane.

8. The light guide structure of claim 1, wherein the first portion, the second portion, and the third portion are integrally formed.

9. The light guide structure of claim 1, wherein the third portion comprises a first surface and further comprises at least one first annular protrusion on the first surface.

10. An electronic device comprising a light guide structure according to claim 1, the electronic device further comprising:
    a housing configured to form an inner space, the housing comprising an outer surface facing in a first direction, an inner surface facing in a direction opposite to the first direction, and a display unit formed between the outer surface and the inner surface so as to have a thickness determined such that light passes through;
    a printed circuit board disposed in the inner space; and
    at least one light-emitting element disposed in the inner space.

11. The electronic device of claim 10, further comprising a transparent or semi-transparent material inside the display unit.

12. The electronic device of claim 10, wherein the light-emitting element is mounted on a surface of the printed circuit board.

13. The electronic device of claim 10, wherein the third portion comprises a second surface facing the printed circuit board, and further comprises at least one second annular protrusion protruding from the second surface.

14. The electronic device of claim 10, wherein the light guide has a width gradually decreasing toward the display unit.

* * * * *